United States Patent [19]
Siegel

[11] Patent Number: 5,867,635
[45] Date of Patent: Feb. 2, 1999

[54] SELECTABLE QUALITY CONTROL AND PRODUCTIVITY IN A COLOR REPROGRAPHIC PRINTING MACHINE

[75] Inventor: Robert P. Siegel, Penfield, N.Y.

[73] Assignee: Xerox Corporation, Stamford, Conn.

[21] Appl. No.: 673,480

[22] Filed: Jul. 1, 1996

[51] Int. Cl.⁶ ................................................ G06K 15/00
[52] U.S. Cl. ........................................ 395/104; 395/105
[58] Field of Search ................................. 395/109, 101, 395/112, 104, 105; 347/115, 116, 119, 232, 234; 399/4, 38, 40, 39, 41, 54, 137, 169, 178–184

[56] References Cited

U.S. PATENT DOCUMENTS 4,977,411  12/1990  Pepe ........................................ 347/234

FOREIGN PATENT DOCUMENTS 0665675  1/1994  European Pat. Off. ......... H04N 1/60
0665676  1/1994  European Pat. Off. ......... H04N 1/60
0665677  1/1994  European Pat. Off. ......... H04N 1/60

*Primary Examiner*—Arthur G. Evans
*Attorney, Agent, or Firm*—Kevin R. Kepner

[57] ABSTRACT

A method and apparatus for producing enhanced quality full color prints in an electrophotographic printing machine. In a electrophotographic printing machine in which multiple color separations are imaged and developed on a photoconductive member, a user selectable enhanced print mode is provided. In the enhanced print mode, each color separation is imaged and developed on the same imaging panel of the photoconductive member. This avoids a degradation in image quality due to physical variations and defects in the photoconductive member. The enhanced mode decreases machine productivity somewhat and is user selectable in situations when very high quality prints are desired.

3 Claims, 2 Drawing Sheets

SELECTABLE QUALITY CONTROL AND PRODUCTIVITY IN A COLOR REPROGRAPHIC PRINTING MACHINE

BACKGROUND OF THE INVENTION

This invention relates generally to a document quality option for an electrophotographic printing machine, and more particularly concerns a user selectable device to produce high quality color prints.

In a typical electrophotographic printing process, a photoconductive member is charged to a substantially uniform potential so as to sensitize the surface thereof. The charged portion of the photoconductive member is exposed to selectively dissipate the charges thereon in the irradiated areas. This records an electrostatic latent image on the photoconductive member. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. In the case of color electrophotography, each of the color separations must be independently developed on the photoconductor before it can be transferred, either directly to the sheet, or more commonly to an intermediate transfer belt. The toner particles are then heated to permanently affix the powder image to the copy sheet.

For purposes of reliability, it is desirable to provide a photoconductive drum or belt which is large enough to accommodate several image containing pitches or panels. It is the nature of these photoconductive materials to contain electrical properties which tend to vary as a function of position. Therefore it is to be expected that each panel on a photoconductive element will have properties that differ slightly from the adjacent panels. Because the accurate rendering of color images depends on very precise control of the electrostatic potentials throughout the image, it is to be expected that the very best quality will be obtained when the same physical panel is used to develop all of the color separations for a given image. It is desirable to enable a user to select a standard or an enhanced color quality (CQ)mode of operation. This can be done by means of a user interface. In the enhanced CQ mode, each color separation of a given image is developed on the same photoreceptor panel. This entails waiting for as many as N-1 wasted pitches for an N pitch photoreceptor, but at the same time it improves image uniformity since the effect of panel to panel variations are significantly reduced. In the standard CQ mode, each separation is developed on the subsequent panel which significantly improves productivity but adds non uniformity to the image.

The following disclosures may relate to various aspects of the present invention:

EP-A 0,665,676
Inventor: Winter, et al.
Filed: Jan. 27, 1994
EP-A 0,665,677
Inventor: Winter, et al.
Filed: Jan. 27, 1994
EP-A 0,665,675
Inventor: Naik, et al.
Filed: Jan. 27, 1994

Some portions of the foregoing disclosures may be briefly summarized as follows:

EP-A 0,665,676 describes a printer in which different print quality modes invoke different color rendering options for a particular object to be printed in a composite document having objects of differing types in a color inkjet printer.

EP-A 0,665,677 describes a method of using a printer system for identifying one or more different types of color objects in a document, selecting a preferred rendering option such as halftoning and/or color matching for each one of such different color object types, respectively, and then printing the document in accordance with the rendering options selected for each of such different color object types, in a printing system such as an inkjet color printer.

EP-A 0,665,675 discloses in a color printer system such as a color inkjet printer, an interactive user interface allows a choice between one-button automatic control of color output or multibutton control of color output, with both automatic and manual options providing independent control for color halftoning and for color correction based on the types of objects to be printed.

SUMMARY OF THE INVENTION

In accordance with one aspect of the present invention there is provided a control device for printing enhanced quality color prints in an electrophotographic printing machine, comprising a photoconductive member having a plurality of imaging panels, a transfer member for receiving a plurality of color toner images to form a composite multicolor toner image and a controller, having a first user selectable mode, wherein each color separation for a composite image is exposed and developed on the same imaging panel of said photoconductive member, so as to produce a high quality, uniform image.

Pursuant to another aspect of the present invention, there is provided a method for printing enhanced quality color prints in an electrophotographic printing machine, comprising exposing and developing each color separation of a multicolor composite toner image on the same imaging panel of a photoconductive member so as to minimize variability between the properties of each color toner separation.

Other features of the present invention will become apparent as the following description proceeds and upon reference to the drawings, in which:

DETAILED DESCRIPTION OF THE INVENTION

Figure 1:
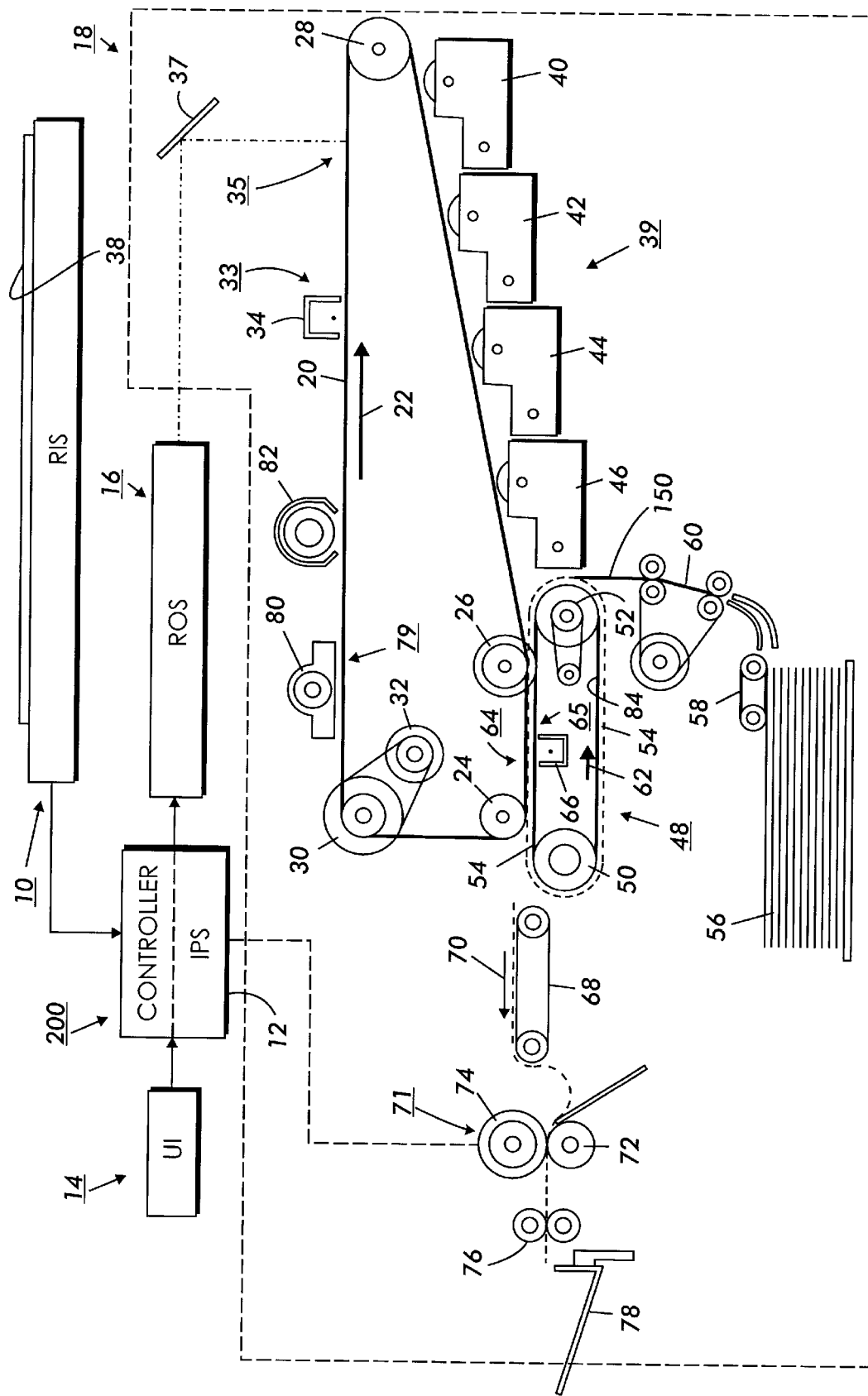
FIG. 1 is a schematic elevational view of a representative full color electrophotographic printing machine utilizing the invention herein.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

For a general understanding of the features of the present invention, reference is made to the drawings. In the drawings, like references have been used throughout to designate identical elements. FIG. 4 is a schematic elevational view of an illustrative electrophotographic machine incorporating the features of the present invention therein. It will become evident from the following discussion that the present invention is equally well suited for use in a wide variety of printing systems, and is not necessarily limited in its application to the particular system shown herein.

Turning initially to FIG. 1, during operation of the printing system, a multi-color original document 38 is positioned on a raster input scanner (RIS) indicated generally by the reference numeral 10. The RIS contains document illumination lamps, optics, a mechanical scanning drive, and a charge coupled device (CCD array). The RIS captures the entire original document and converts it to a series of raster scan lines and measures a set of primary color densities, i.e. red, green and blue densities, at each point of the original document. This information is transmitted to controller 200 which includes an image processing system (IPS), indicated generally by the reference numeral 12. IPS 12 contains control electronics which prepare and manage the image data flow to a raster output scanner (ROS), indicated generally by the reference numeral 16. A user interface (UI), indicated generally by the reference numeral 14, is in communication with IPS 12. UI 14 enables an operator to control the various operator adjustable functions. The output signal from UI 14 is transmitted to IPS 12.

A signal corresponding to the desired image is transmitted from IPS 12 to ROS 16, which creates the output copy image. ROS 16 lays out the image in a series of horizontal scan lines with each line having a specified number of pixels per inch. ROS 16 includes a laser having a rotating polygon mirror block associated therewith. ROS 16 exposes a charged photoconductive belt 20 of a printer or marking engine, indicated generally by the reference numeral 18, to achieve a set of subtractive primary latent images. The latent images are developed with cyan, magenta, and yellow developer material, respectively. These developed images are transferred to a copy sheet in superimposed registration with one another to form a multi-colored image on the copy sheet. This multi-colored image is then fused to the copy sheet forming a color copy.

With continued reference to FIG. 1, printer or marking engine 18 is an electrophotographic printing machine. Photoconductive belt 20 of marking engine 18 is preferably made from a polychromatic photoconductive material. The photoconductive belt moves in the direction of arrow 22 to advance successive portions of the photoconductive surface sequentially through the various processing stations disposed about the path of movement thereof. Photoconductive belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform electrostatic potential.

Next, the charged photoconductive surface is moved through an exposure station, indicated generally by the reference numeral 35. Exposure station 35 receives a modulated light beam corresponding to information derived by RIS 10 having a multi-colored original document 38 positioned thereat. RIS 10 captures the entire image from the original document 38 and converts it to a series of raster scan lines which are transmitted as electrical signals to IPS 12. The electrical signals from RIS 10 correspond to the red, green and blue densities at each point in the original document. IPS 12 converts the set of red, green and blue density signals, i.e. the set of signals corresponding to the primary color densities of original document 38, to a set of calorimetric coordinates. The operator actuates the appropriate keys of UI 14 to adjust the parameters of the copy. UI 14 may be a touch screen, or any other suitable control panel, providing an operator interface with the system. The output signals from UI 14 are transmitted to IPS 12. The IPS then transmits signals corresponding to the desired image to ROS 16. ROS 16 includes a laser with rotating polygon mirror blocks. Preferably, a nine facet polygon is used. ROS 16 illuminates, via mirror 37, the charged portion of photoconductive belt 20 at a rate of about 400 pixels per inch. The ROS will expose the photoconductive belt to record three latent images. One latent image is developed with cyan developer material. Another latent image is developed with magenta developer material and the third latent image is developed with yellow developer material. The latent images formed by ROS 16 on the photoconductive belt correspond to the signals transmitted from IPS 12. A fourth latent image can also be recorded to be developed with black toner.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the compliment of the specific color separated electrostatic latent image recorded on the photoconductive surface. The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document and or to provide undercolor removal in a color image. Each of the developer units is moved into and out of an operative position. In the operative position, the magnetic brush is closely adjacent the photoconductive belt, while in the non-operative position, the magnetic brush is spaced therefrom. In FIG. 1, developer unit 40 is shown in the operative position with developer units 42, 44 and 46 being in the non-operative position. During development of each electrostatic latent image, only one developer unit is in the operative position, the remaining developer units are in the non-operative position. This insures that each electrostatic latent image is developed with toner particles of the appropriate color without commingling.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 52. A sheet gripper (not shown) extends between belts 54 and moves in unison therewith. A sheet 150 is advanced from a stack of sheets 56 disposed on a tray. A friction retard feeder 58 advances the uppermost sheet from stack 56 onto a pre-transfer transport 60. Transport 60 advances sheet 150 to sheet transport 48. Sheet 150 is advanced by transport 60 in synchronism with the movement of sheet gripper 84. In this way, the leading edge of sheet 150 arrives at a preselected position, i.e. a loading zone, to be received by the open sheet gripper. The sheet gripper then closes, securing sheet 150 thereto for movement therewith in a recirculating path. The leading edge of sheet 150 is secured releasably by the sheet gripper. As belts 54 move in the direction of arrow 62, the sheet moves into contact with the photoconductive belt, in synchronism with the toner image developed thereon. At transfer zone 64, a corona generating device 66 sprays ions onto the backside of the sheet so as to charge the sheet to the proper electrostatic voltage magnitude and polarity for attracting the toner image from photoconductive belt 20 thereto. The sheet remains secured to the sheet gripper so as to move in a recirculating path for three cycles. In this way, three different color toner images are transferred to the sheet in superimposed registration with one another. One skilled in the art will appreciate that the sheet may move in a recirculating path for four cycles when under color black removal is used and up to eight cycles when the information on two original documents is being merged onto a single copy sheet. Each of the electrostatic latent images recorded on the photoconductive surface is developed with the appropriately colored toner and transferred, in superimposed registration with one another, to the sheet to form the multi-color copy of the colored original document.

After the last transfer operation, the sheet gripper opens and releases the sheet. A conveyor 68 transports the sheet, in the direction of arrow 70, to a fusing station, indicated generally by the reference numeral 71, where the transferred toner image is permanently fused to the sheet. The fusing station includes a heated fuser roll 74 and a pressure roll 72. The sheet passes through the nip defined by fuser roll 74 and pressure roll 72. The toner image contacts fuser roll 74 so as to be affixed to the sheet. Thereafter, the sheet is advanced by a pair of rolls 76 to catch tray 78 for subsequent removal therefrom by the machine operator.

The last processing station in the direction of movement of belt 20, as indicated by arrow 22, is a cleaning station, indicated generally by the reference numeral 79. A rotatably mounted fibrous brush 80 is positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

Figure 2:
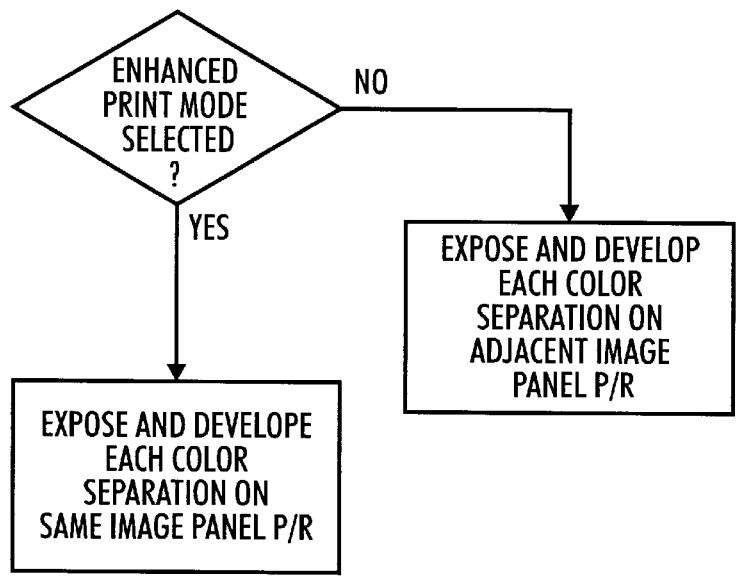
FIG. 2 is a flow diagram illustrating the method of the present invention.
Figure 3:
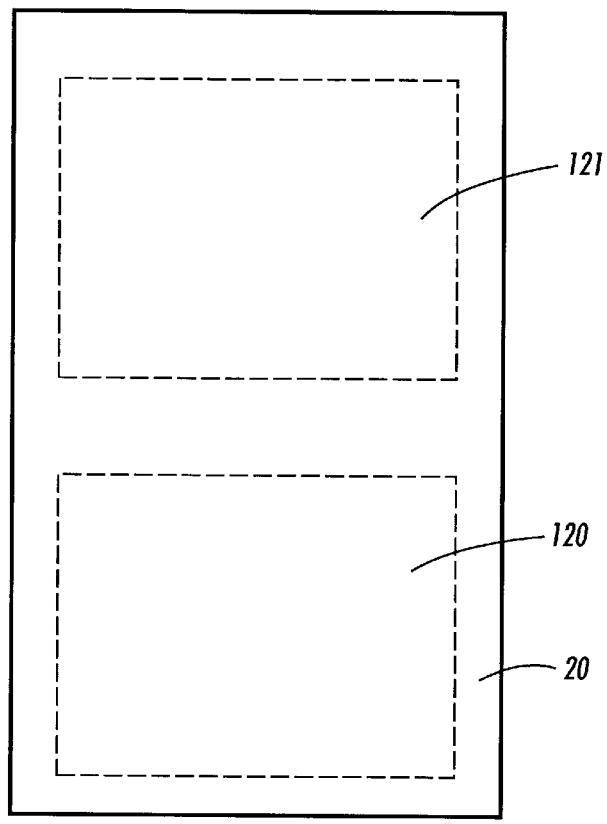
FIG. 3 is a top view of the photoreceptive member illustrating the imaging panels.

In a process color marking engine there are a number of architectures which can be used. Among these are several which transfer each individual color separation to an intermediate substrate before transferring the entire image to paper or to a sheet transport (as shown herein). These intermediate belt architectures are generally used to reduce problems associated with multiple belt to paper transfers, given the unpredictability of paper. In an engine where various paper sizes will be used, it is necessary to design the belt such that its length will exceed that of the longest sheet of paper to be used. This will generally result in a multiple pitch belt when the smaller, more common paper sizes are used. Given a multiple pitch belt, as illustrated in FIG. 3, a system designer is then faced with the question of whether to produce an image sequence that will result in individual color separations being placed on subsequent pitches 120, 121 or panels as they are sometimes called, or whether to place the first color separation of image one on panel one, the first color separation of image two on the second panel on and so forth. An example of these combinations is given in Table 1. FIG. 2 illustrates a flow diagram for the method described herein.

Assume that in this example, the intermediate is one pitch. The table shows that for a 4 pitch belt, with a 1 pitch intermediate, there is a difference in productivity for the two sequences. Sequence 2 requires a total of 14 pitches while sequence 1 requires only 8. Careful consideration will show that differences in productivity will vary according to the type of job being done, but that sequence 1 will always have equal or greater productivity than sequence 2. From the standpoint of productivity, sequence 1 is preferred. Now consider copy quality. Since there is considerable variation in the electrical properties of photoreceptors, it is likely that there will be panel to panel variations within any given belt. In monochrome copying, these electrical variations manifest themselves as density variations. However, in a color process, panel to panel variations will manifest themselves as far more noticeable color shifts, thus the tolerance for electrical variations in color printing is significantly smaller than in the monochrome case. We can see that from a copy quality standpoint, sequence 2 would be preferable since each color separation for a given image is maintained on the same physical panel (e.g. all separations of image 1 are developed on panel 1). By using the same panel for each of the four color separations, we can eliminate any color shifts which result from panel to panel variation in electrical charge distribution. If point X on Panel 2 is at a slightly lower potential than nominal, all four separations will be slightly underdeveloped, but at the same relative level, thus the overall hue will be consistent with the desired result. The effect of this underdevelopment will be a slight dropoff in intensity which is far less noticeable. On the other hand, if point X on Panel 2 is slightly low and point X on Panel 3 is slightly high, this can result in a significant shift in hue if both these panels are used for subsequent color separations as in Sequence 1. The human eye is highly sensitive to changes in hue.

The actual difference in copy quality between two sequences depends on both the uniformity of the photoreceptor belt and the content of the image. It is clear that selecting sequence 2 will provide CQ that is equal to or better than sequence 1, just as selecting sequence 1 provides productivity than sequence 2.

TABLE 1

| Pitch No. | Panel No. | Sequence 1 | Sequence 2 |
|---|---|---|---|
| 1 | 1 | Cyan 1 | Cyan 1 |
| 2 | 2 | Magenta 1 | Cyan 2 |
| 3 | 3 | Yellow 1 | Skip |
| 4 | 4 | Black 1 | Skip |
| 5 | 1 | Cyan 2 | Magenta 1 |
| 6 | 2 | Magenta 2 | Magenta 2 |
| 7 | 3 | Yellow 2 | Skip |
| 8 | 4 | Black 2 | Skip |
| 9 | 1 | Done | Yellow 1 |
| 10 | 2 | Done | Yellow 2 |
| 11 | 3 | Done | Skip |
| 12 | 4 | Done | Skip |
| 13 | 1 | Done | Black 1 |
| 14 | 2 | Done | Black 2 |

This is clearly a tradeoff, but it is a tradeoff that will be controlled by the user via the machine control panel, to select between standard and enhanced CQ modes. The standard mode will use the more productive sequence 1 while the enhanced mode will use sequence 2. The user will be advised to utilize enhanced mode for images where color fidelity and consistency is crucial. The user will also be advised that this high quality job may take slightly longer. Sequence 1 will be the default mode since skipping pitches has a slight negative impact on the system reliability and as it is expected that the copy quality provided by the standard mode will be acceptable for most applications. There is a precedent for this approach in the early days of personal computers when dot-matrix printers were used. A common feature of those printers was a user-selectable draft vs. letter quality mode.

In recapitulation, there is provided a method and apparatus for producing enhanced quality full color prints in an electrophotographic printing machine. In a electrophotographic printing machine in which multiple color separations are imaged and developed on a photoconductive member, a user selectable enhanced print mode is provided. In the enhanced print mode, each color separation is imaged and developed on the same imaging panel of the photoconductive member. This avoids a degradation in image quality due to physical variations and defects in the photoconductive member. The enhanced mode decreases machine productivity somewhat and is user selectable in situations when very high quality prints are desired.

It is, therefore, apparent that there has been provided in accordance with the present invention, a user selectable enhanced print mode that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A control device for printing enhanced quality color prints in an electrophotographic printing machine, comprising:

a photoconductive member having a plurality of imaging panels;

a transfer member for receiving a plurality of color toner images to form a composite multicolor toner image;

a controller, having a first user selectable mode, wherein each color separation for a composite image is exposed and developed on the same imaging panel of said photoconductive member, so as to produce a high quality, uniform image.

2. A device according to claim 1, wherein said controller has a second user selectable mode, wherein each color separation for a composite color image is exposed and developed on adjacent subsequent panels of said photoconductive member so as to increase machine productivity.

3. A method for printing enhanced quality color prints in an electrophotographic printing machine, comprising exposing and developing each color separation of a multicolor composite toner image on the same imaging panel of a photoconductive member so as to minimize variability between the properties of each color toner separation.

* * * * *